United States Patent Office 3,740,378
Patented June 19, 1973

3,740,378
METHOD FOR MAKING POLYIMIDES FROM ALIPHATICALLY UNSATURATED BIS-IMIDES
James V. Crivello, Mechanicville, N.Y., assignor to General Electric Company
No Drawing. Filed Mar. 27, 1970, Ser. No. 23,491
Int. Cl. C08g 20/20
U.S. Cl. 260—78 UA          3 Claims

ABSTRACT OF THE DISCLOSURE

Polyimides can be made at temperatures as low as 25° C. by effecting contact between an aryl polyamine and an aliphatically unsaturated bisimide, such as a bis-maleimide, in the presence of an acid catalyst, such as an organic carboxylic acid. The resulting polyimides can be used as molding compounds, laminates, wire coatings, and in applications requiring the services of materials possessing resistance to change at elevated temperatures.

---

The present invention relates to a method of making polyimides by employing certain acid catalysts to promote the rate of intercondensation between an aryl polyamine and an aliphatically unsaturated bisimide.

As shown by Pat. 2,818,405 Kovacic directed to elastomeric reaction products, bismaleimides and liquid organic polyamines are mixed to produce a dispersion of the solid in the liquid organic polyamine reactant. When the mixture is heated to an elevated temperature, an elastomeric reaction product is produced.

Experience has shown that when the organic polyamine is a solid, such as an aryl diamine, effective contact between the bismaleimide and the aryl diamine is often difficult to achieve. Mixing the reactants in a finely divided form and converting the resulting blend to a melt has been found to be effective, but extended reaction times and elevated temperatures such as exceeding 160° C. is often necessary. Nonuniform polymerization also can occur since optimum contact is difficult to achieve. In addition, due to the severe conditions employed during melt polymerization, oxidation and sublimation of the organic diamine also can occur resulting in irregular polymer formation.

The present invention is based on a discovery that improved results with respect to conditions required, as well as rate of reaction between solid aliphatically unsaturated bisimides and aryl polyamines can be achieved by effecting contact between substantially equal molar amounts of such reactants in the presence of an effective amount of an acidic catalyst including organic carboxylic acids, particular mineral acids, as well as specific acidic materials, such as fluoroboric acid. This result is quite surprising, since addition of an aryl polyamine across an aliphatically unsaturated bond, as involved in the formation of polyimides from such reactants has not previously been known to be catalyzed by an acidic reagent.

In accordance with the present invention, there is provided a method for making a polyimide which comprises effecting contact between an organic polyamine and a bisimide of the formula, (1)
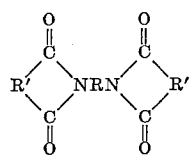

in the presence of an effective amount of an acidic catalyst, where R is a divalent organo radical and R' is an aliphatically unsaturated divalent organo radical.

Radicals included by R in Formula 1 are, for example, heterocyclic radicals, arylene radicals having from 6 to 15 carbon atoms, and YGY, where Y is arylene, such as phenylene, toluene, anthrylene, arylenealkylene, such as phenyleneethylene, etc., G is a divalent organo radical selected from alkylene radicals having from 1 to 10 carbon atoms, —O—, —S—, SO$_2$,

where Z is selected from methyl and trihalomethyl such as trifluoromethyl, trichloromethyl, etc. Aliphatically unsaturated divalent organo radicals included by R' are, for example,

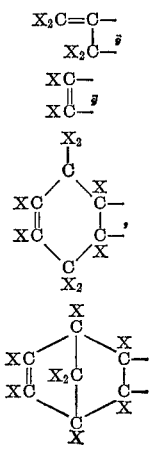

where X is a radical selected from hydrogen, lower alkyl, halogen, or mixtures thereof, such as chloro, methyl, ethyl, propyl, bromo, etc. In instances where the R' radicals have isolated double bonds which are not activated, a reduced rate of addition with the polyamine has been found to occur.

Some of the organic polyamines which can be employed in the practice of the invention are included by the formula, (2)          NH$_2$R''NH$_2$ where R'' is a diorgano radical included by R previously defined, which includes polyamines such as meta-phenylene diamine; p-phenylene diamine; 4,4'-diamino-diphenyl propane; 4,4'-diamino-diphenyl methane; benzidine; 4,4'-diaminodiphenyl sulfide; 4,4'-diamino-diphenyl sulfone; 3,3'-diaminodiphenyl sulfone; 4,4'-diamino-diphenyl ether; 2,6-diaminopyridine; tris(4-amino-phenyl)phosphine oxide; bis(4-aminophenyl)-N-methylamine; 1,5-diaminonaphthalene; 3,3'-dimethyl-4,4'-diamino-biphenyl; 3,3'-dimethoxy-benzidine; 2,4-diaminotoluene, etc. In addition to the aforementioned aryldiamines, the polyamines also can include benzoguanamine, melamine, 1,3,5-triaminobenzene, 3,3',4,4'-tetraaminobiphenyl, 1,3,5 - triaminonaphthalene, etc., and mixtures of two or more of the aforementioned polyamines.

Typical of the bis-imides included by Formula 1 which can be employed with the organic polyamine are, for instance, N,N'-ethylene-bis-maleimide,
N,N'-m-phenylene-bis-maleimide,
N,N'-p-phenylene-bis-maleimide,
N,N'-hexamethylene-bis-maleimide,
N,N'-p,p'-diphenyldimethylsilyl-bis-maleimide,
N,N'-p,p'-diphenylmethane-bis-maleimide;

other bisimides such as

N,N'-p,p'-diphenylether-bis-maleimide,
N,N'-p,p'-diphenylthioether-bis-maleicide,
N,N'-diphenylsulfone-bis-maleimide,
N,N'-dicyclohexylmethane-bis-maleimide,
N,N'-m-xylylene-bis-maleimide,
N,N',p,p'-benzophenone-bis-maleimide,
N,N'-(3,3'-dichloro-p,p'-biphenylene) bis-maleimide,
N,N'-p,p'-diphenyl ether-bis-endomethylene-tetrahydrophthalimide,
N,N'-p,p'-diphenylmethane-bis-tetrahydrophthalimide, etc.

Halogenated derivatives of such bis-imides where halogen is on the olefinic portion of the imide and on an aryl nucleus can also be employed without departing from the scope of the invention, e.g., N,N'-(3,3'-dichloro-4,4'-biphenyloxy)-bis-maleimide, N,N' - (3,3'-dibromo-4,4'-diphenylmethane - bis - hexachloroendomethylenetetrahydrophthalimide, etc.

Included by the acid catalysts which can be employed in the practice of the invention are, for example, organic carboxylic acids such as acetic, propionic, chloroacetic, dichloroacetic, trichloroacetic, trifluoroacetic, cyanoacetic, formic, etc.; mineral acids such as perchloric, hydroiodic, hydrobromic, fluoroboric, etc.; in addition organic dicarboxylic acids also can be employed, such as maleic and oxalic acid, etc. In particular situations, improved results can be achieved by employing mixtures of organic carboxylic acids and mineral acids which have been found to enhance the reactivity of the organic carboxylic acid. The acid catalysts often can be employed as a solvent for the mixtures of the aryl diamine amine and bisimide reactant.

In the practice of the invention, the bisimide and the organic diamine are contacted in the presence of the acid catalyst while maintaining a temperature in the range of between about 25° C. to 175° C.

Experience has shown that effects results can be achieved in the absence of organic solvents particularly where the acid catalysts is utilized as the solvent. If desired, a suitable organic solvent such as benzonitrile, acetonitrile, dimethylacetamide, dimethylformamide, N-methylpyrrolidone, nitromethane, nitrobenzene, xylene, benzene, toluene, acetone, chloroform, methylenechloride, can be employed to facilitate contact between the reactants and to recover the final product. The proportion of the organic polyamine to bisimide can vary widely. Effective results can be achieved if from 0.1 to 10 moles of organic polyamine, per mole of bisimide is employed, and preferably from 0.5 to 2 mole of organic polyamine per mole of bisimide.

At temperatures in the range of between 25° C. to 80° C., reaction time can be as long as 2 or 3 hours or more. In some instances, depending on such factors as the particular reactants employed, the acid catalyst, etc., effective results can be achieved at ambient temperatures, or under reflux conditions where the acid catalyst is employed in amounts sufficient to serve as a solvent for the reactants. In particular instances, effective results can be achieved with as little as 0.1 percent by weight of the acid catalyst based on the total weight of reaction mixture.

Recovery of the polymer can be achieved by standard methods such as precipitation with an appropriate liquid such as water, acetone, or methanol, etc. Polymers can be made by the method of the subject invention having intrinsic viscosities in dimethylformamide ranging from 0.01 to 1.0 dl./g. at 25° C.

The polymers made by the present invention can be employed as paints, laminates, thermosetting resins, adhesives, coatings, binders, wire varnishes, etc. Two applications of special interest are in the areas of thermosetting molding compounds and laminating resins. Catalysts can be employed, such as from 1 to 5 percent by weight of a free radical catalyst, for example dicumyl peroxide, or anionic catalysts to cure the resins made by the method of the invention. The addition of catalysts is not necessary, when high temperatures such as above 200° C. is employed during fabrication. When the above resin is used to impregnate glass cloth, laminates having desirable properties may be made by heating layers of the impregnate under pressure at temperatures from 180–300° C.

The polymers provided by the method of the present invention can be blended with inorganic fillers at up to 75 percent by weight of the resulting blend. For example, blends of the polyimides and inorganic fillers such as silica, glass fibers, graphite, carbon fibers, asbestos, titanium oxide can be cured with organic peroxides at up to 5 percent by weight of the blend. Organic peroxides such as dicumyl peroxide, benzoyl peroxide, tertiary butyl perbenzoate, cumene hydroperoxide, etc. can be employed. The resulting compositions can be molded to make bearings, automobile parts, etc.

In order that those skilled in the art will be better able to practice the invention, the following examples are given by way of illustration and not by way of limitation. All parts are by weight.

EXAMPLE 1

There was mixed under a nitrogen atmosphere 12 parts of 4,4'-diaminodiphenylmethane, 43 parts of N,N'-p,p'-diphenylmethane-bis-maleimide and 600 parts of glacial acetic acid. The mixture was heated to reflux and maintained at this temperature for two hours. During this period, a viscous oil was separated from the mixture. The mixture was then poured into 1200 parts of distilled water effecting the precipitation of product. The product was then recovered by filtration and then washed with water and dried for several hours under vacuum. There was obtained 54.3 parts of product, which was a quantitative yield. Based on method of preparation and elemental analysis, the product was a polyimide consisting essentially of chemically combined units of the formula,

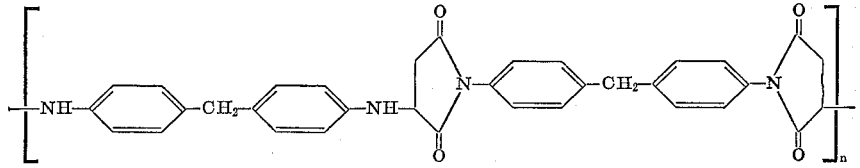

where n has a value greater than 1.

A blend of equal parts of glass fibers and the above resin is made by dry mixing. There is added about 5 percent by weight of dicumyl peroxide to the resulting mixture. The mixture is then compression molded at about 250° C. for five minutes to produce a test bar. Evaluation of the bar shows that it has high modulus and flexural strength and is useful for making high performance automotive parts.

EXAMPLE 2

There was mixed under a nitrogen atmosphere 21.5 parts of N,N'-p,p'-diphenyl-bis-maleimide, 12 parts of 4,4'-oxydianiline and 300 parts of glacial acetic acid. The mixture was refluxed for 3 hours while being stirred. During this period, product precipitated out of solution. The mixture was then poured into 1200 parts of distilled water resulting in the precipitation of product. The product was recovered by filtration and dried under vacuum. A quantitative yield, 33.9 parts of product, was obtained. The product had a softening point of 120–130° C. Based on method of preparation, the product was a polyimide consisting of chemically combined units of the formula,

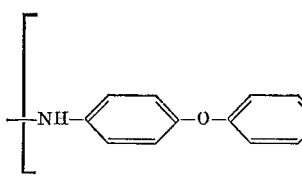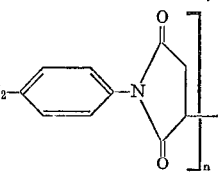

where *n* has a value of at least 2.

EXAMPLE 3

There was mixed together under nitrogen atmosphere 43 parts of N,N'-p,p'-diphenylmethane-bis-maleimide, 20 parts of 4,4'-diamino-diphenylsulfone, and 400 parts of glacial acetic acid. The mixture was refluxed for 5 hours while it was stirred. The mixture was then allowed to cool to room temperature and the light yellow amorphous product was separated. The mixture was poured into 1200 parts of distilled water and the solids were recovered by filtration. The product was ground and then washed with water. There was obtained 61.6 parts of product having a softening point of 105–120° C. Based on method of preparation, the product was a polyimide consisting essentially of chemically combined units of the formula

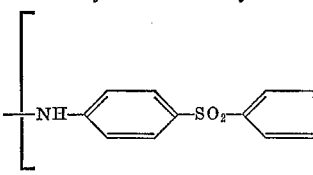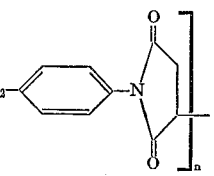

where *n* has a value greater than 2.

A 30 percent solution in dimethylformamide of the above polyimide is employed to impregnate glass cloth which has been heat cleaned by immersing the cloth in the solution. The cloth is then allowed to air dry. The procedure is repeated until several treated glass cloths are obtained. A laminate is then fabricated by heating a stack of the treated cloth to 250° C. while under a pressure of 1000 p.s.i.

EXAMPLE 4

The procedure of Example 3 was repeated except that there was employed 13 parts of p-phenylenediamine in place of the 4,4'-diaminodiphenylsulfone. There was obtained 58.8 parts of product having a softening point of 200–210° C. Based on method of preparation, the product was a polyimide consisting essentially of chemically combined units of the formula,

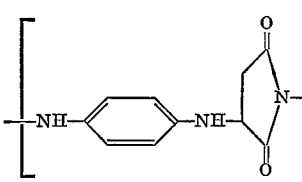

where *n* has a value greater than 3.

EXAMPLE 5

In accordance with Example 1, there is mixed under a nitrogen atmosphere, 38 parts of melamne, 322 parts of N,N'-p,p'-diphenylmethane-bis-maleimide, 500 parts of glacial acetic acid and 10 parts of trifluoroacetic acid. The mixture is refluxed for 3 hours while it is stirred. The mixture is then allowed to cool to room temperature and poured into 1200 parts of water. The precipitated solids are then recovered by filtration. A quantative yield of product is obtained. Based on method of preparation, the product is a polyimide. The product is found useful as a molding and laminating compound when milled with 2 percent by weight of benzoyl peroxide.

EXAMPLE 6

A mixture of 35.2 parts of N,N'-p,p'-diphenylmethane-bis-maleimide, 19.8 parts of 4,4'-diamino-diphenylmethane, 100 parts of nitrobenzene and 10 parts of acetic acid were heated at 115–120° C. for 5.5 hours under nitrogen atmosphere. During this time, an increase in the viscosity of the solution was noted. The mixture was poured into 120 parts of ethanol to effect the precipitation of polymer. The solids were ground to a powder in a Waring blender. After washing with hot ethanol, filtering and drying, there was obtained a quantitative yield of a pale yellow resin having an intrinsic viscosity of 0.20 dl./g. DMF at 25° C. Based on method of preparation, the product was a polyimide having the same chemically combined units as shown in Example 1.

Although the above examples are limited to only a very few of the very many variables within the scope of the invention, it should be understood that the present invention is directed to a method for making a much broader class of polyimides utilizing the bisimides of Formula 1 in combination with a polyamine as previously described in the presence of an effective amount of an acidic catalyst.

I claim:

1. A method for making a resinous polyimide which comprises contacting from about 0.5 to 2 mols of (1) arylene diamine per mole of (2) imide of the formula,

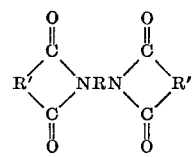

in the presence of a catalytic amount of acetic acid, where R is a divalent organo radical and R' is an aliphatically unsaturated divalent organo radical.

2. A method in accordance with claim 1, where the bisimide is bismaleimide.

3. A method in accordance with claim 1, where the polyamine is 4,4'-diaminodiphenylmethane.

References Cited

UNITED STATES PATENTS

| | | | |
|---|---|---|---|
| 2,818,405 | 12/1957 | Kovacic | 260—78 UA |
| 3,562,223 | 2/1971 | Bargain et al. | 260—78 UA |
| 3,652,511 | 3/1972 | Vincent et al. | 260—78 UA |
| 3,669,930 | 6/1972 | Asahara et al. | 260—78 UA |
| 2,306,918 | 12/1942 | Weiss et al. | 260—78 UA |

HAROLD D. ANDERSON, Primary Examiner

U.S. Cl. X.R.

260—41 AG, 47 CZ, 47 UA, 78 TF, 78 SC